(12) United States Patent
Kaltenbach

(10) Patent No.: US 8,663,065 B2
(45) Date of Patent: Mar. 4, 2014

(54) DRIVE-TRAIN WITH AN AUTOMATED GROUP-TRANSMISSION

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 343 days.

(21) Appl. No.: 13/105,231

(22) Filed: May 11, 2011

(65) Prior Publication Data

US 2011/0315462 A1 Dec. 29, 2011

(30) Foreign Application Priority Data

Jun. 28, 2010 (DE) .......................... 10 2010 030 575

(51) Int. Cl.
*H02P 17/00* (2006.01)

(52) U.S. Cl.
USPC .............. 477/15; 477/4; 477/5; 477/6; 477/8; 477/9

(58) Field of Classification Search
USPC .............................. 475/1–5; 477/15, 4–6, 8, 9
See application file for complete search history.

(56) References Cited

U.S. PATENT DOCUMENTS

| 8,523,734 B2 * | 9/2013 | Mepham et al. .................. 477/3 |
| 2010/0120582 A1 | 5/2010 | Reith et al. |
| 2013/0036848 A1 * | 2/2013 | Becke et al. ..................... 74/333 |

FOREIGN PATENT DOCUMENTS

| DE | 10152477 A1 | 5/2003 |
| DE | 102007007257 A1 | 8/2008 |
| DE | 10 2007 010 829 A1 | 9/2008 |
| DE | 102007010829 A1 | 9/2008 |
| DE | 102008001650 | * 11/2009 |
| DE | 102008002380 A1 | 12/2009 |
| DE | 102009000710 A1 | 8/2010 |
| DE | 102009054752 A1 | 6/2011 |
| WO | 2008/107318 A1 | 9/2008 |

* cited by examiner

*Primary Examiner* — Tisha Lewis
(74) *Attorney, Agent, or Firm* — Davis & Bujold, PLLC; Michael J. Bujold

(57) ABSTRACT

A drivetrain of a motor vehicle, with a hybrid drive, comprising an internal combustion engine and an electric machine and a semi-automatic group transmission. The semi-automatic group transmission comprises at least a main transmission and a downstream group in drive connection downstream with the main transmission. An input shaft of the semi-automatic group transmission is connected, via a controllable starting clutch, to the internal combustion engine of the hybrid drive and an output shaft of the semi-automatic group transmission is connected to an axle drive. Depending on the shift position of at least one shifting element, the electric machine can be coupled to the force flow or the torque flow of the drivetrain between the main transmission and the downstream group of countershaft design and/or between the downstream group of a countershaft design and the axle drive.

17 Claims, 2 Drawing Sheets

DRIVE-TRAIN WITH AN AUTOMATED GROUP-TRANSMISSION

This application is claims priority from German patent application serial no. 10 2010 030 575.8 filed Jun. 28, 2010.

FIELD OF THE INVENTION

The invention concerns a drive-train with an automated group transmission. Furthermore, the invention concerns a method for operating such a drivetrain.

BACKGROUND OF THE INVENTION

Semi-automatic gearshift transmissions designed as group transmissions with a multi-step main transmission and a downstream group, in particular designed as a range group in drive connection downstream from the main transmission, and/or an upstream group, in particular designed as a splitter group in drive connection upstream from the main transmission, are known for example from DE 10 2007 010 829 A1, and are used for example in commercial vehicles. By means of a splitter group for example designed with two steps with a gear ratio interval that corresponds to approximately half of an average gear ratio interval between two consecutive gear ratio steps of the main transmission, the gear ratio intervals of the main transmission are halved and the total number of gears available is doubled. By means of a range group, for example with two steps with a gear ratio interval above the total gear ratio interval of the main transmission by approximately an average gear ratio interval between two consecutive gear ratios of the main transmission, the spread of the group transmission is approximately doubled and the total number of gears available is again doubled.

SUMMARY OF THE INVENTION

The present invention concerns a drivetrain with an automated group transmission and a method for operating such a drivetrain, whose group transmission comprises at least a main transmission and a downstream group. The upstream group is optional. The downstream group is preferably designed as a range group, but it can also be a splitter group.

When such an automated group transmission is integrated in a drivetrain of a motor vehicle, an input shaft of the automated group transmission, namely an input shaft of the main transmission or, if there is an upstream group, an input shaft of the upstream group, is connected by a controllable starting clutch to the drive aggregate, and an output shaft of the automated group transmission is connected to an axle drive.

If the drive aggregate is in the form of a pure internal combustion engine or a hybrid drive with an internal combustion engine, the internal combustion engine is coupled to the input shaft of the group transmission by the starting clutch. If the drive aggregate is a hybrid drive with an internal combustion engine and an electric machine, in drivetrains known from practice the electric machine is connected either between the internal combustion engine and the starting clutch to act as a so-termed crankshaft starter generator (CSG), or between the starting clutch and the input shaft of the group transmission to act as a so-termed integrated starter generator (ISG).

The drivetrains known from the prior art which have as their transmission an automated group transmission and as their drive aggregate a hybrid drive with an internal combustion engine and an electric machine, have the disadvantage that while a gearshift is taking place in the group transmission no traction force support can be provided to compensate or counteract a traction force interruption, so that comfort is compromised.

Starting from there, the present invention addresses the problem of providing a new type of drivetrain with an automated group transmission.

According to the invention, the electric machine of the hybrid drive can be coupled into the force flow or torque flow of the drivetrain between the main transmission and a downstream group of countershaft design and/or between the downstream group of countershaft design and the axle drive, depending on the shift position of at least one shifting element.

With the drivetrain according to the invention, while a gearshift is taking place in the group transmission traction force support can be provided at the drive output or axle drive of the drivetrain in order to counteract or compensate for a traction force interruption. This increases the comfort while the gearshift is taking place. The traction force support can be provided while a gearshift is taking place in the main transmission, in the upstream group if present, and in the downstream group.

BRIEF DESCRIPTION OF THE DRAWINGS

Preferred further developments of the invention from the description given below. Example embodiments of the invention, to which it is not limited, are described in greater detail with reference to the drawing, which shows.

DETAILED DESCRIPTION OF THE PREFERRED EMBODIMENTS

Figure 1:
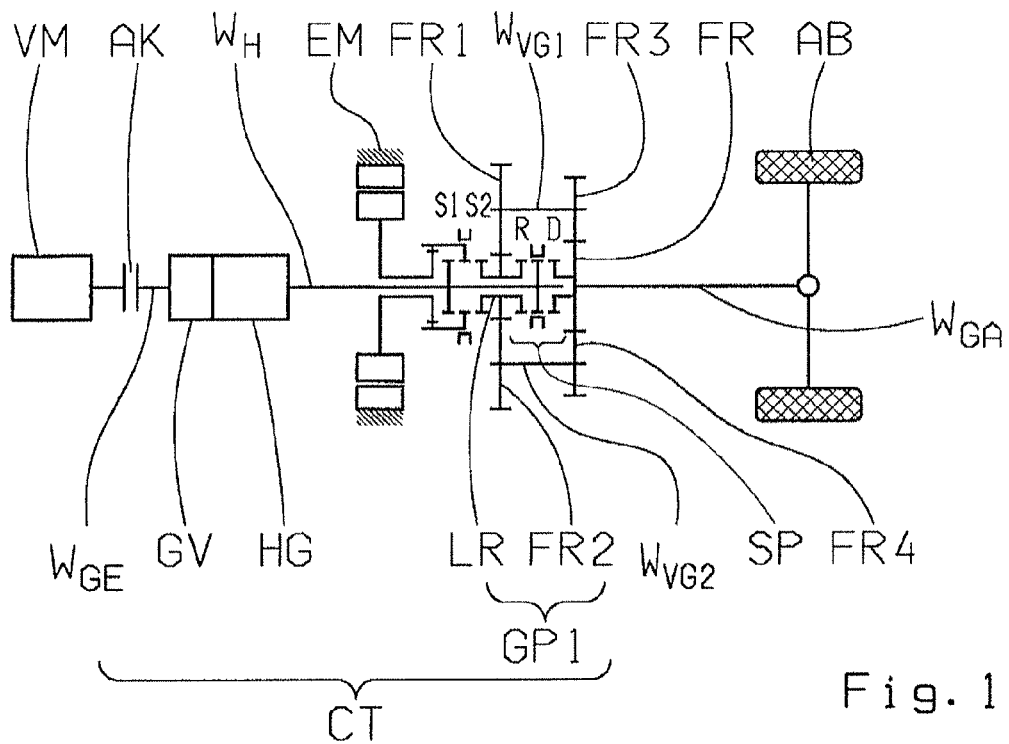
FIG. 1: Layout of a drivetrain according to the invention according to a first example embodiment of the invention.

The present invention concerns a drivetrain of a motor vehicle with a hybrid drive, an automated group transmission CT and an axle drive AB. The hybrid drive of the drivetrain comprises an internal combustion engine VM and an electric machine EM. The automated group transmission CT comprises at least a main transmission HG and a downstream group GP in drive connection downstream from the main transmission HG. In addition an upstream group GV in drive connection upstream from the main transmission HG may be present, although the upstream group GV is optional.

The internal combustion engine VM of the drivetrain can be coupled by means of a starting clutch AK to an input shaft $W_{GE}$ of the automated group transmission CT. If the starting clutch AK is open, the internal combustion engine VM is uncoupled from the input shaft $W_{GE}$ of the automated group transmission CT. When the starting clutch is engaged, the internal combustion engine VM is coupled to the input shaft $W_{GE}$ of the automated group transmission CT. An output shaft $W_{GA}$ of the automated group transmission is connected to the axle drive AB.

Depending on the shift position of at least one shifting element S1, S2, the electric machine EM of the hybrid drive of the drivetrain according to the invention can be coupled into the force flow or torque flow of the drivetrain between the main transmission HG and a downstream group GP of countershaft design, and/or between the downstream group GP of countershaft design and the axle drive AB.

Thus, depending on the shift position of the—or of each—shift element S1, S2, the electric machine EM of the hybrid drive can be coupled with the force flow or torque flow of the drivetrain exclusively between the main transmission HG and the downstream group GP of countershaft design.

Likewise, depending on the shift position of the—or of each—shift element S1, S2, the electric machine EM of the hybrid drive can be coupled with the force flow or torque flow of the drivetrain exclusively between the downstream group GP of countershaft design and the axle drive AB.

Furthermore, depending on the shift position of the—or of each—shift element S1, S2, the electric machine EM of the hybrid drive can be coupled into the force flow or torque flow of the drivetrain both between the main transmission HG and the downstream group GP and also between the downstream group GP and the axle drive AB.

Depending on the shift position of the—or of each—shifting element S1, S2, the electric machine EM of the hybrid drive can also be completely decoupled from the force flow or torque flow of the drivetrain.

If two independently controllable or shiftable shift elements S1 and S2 are present, then all four of the above-mentioned variants for coupling the electric machine EM of the hybrid drive into, or decoupling it from the force flow or torque flow of the drivetrain can be realized. Depending on the shifting of the two independently shiftable shifting elements S1, S2, the electric machine EM can then either be coupled into the force or torque flow of the drivetrain exclusively between the main transmission HG and the downstream group GP, or exclusively between the downstream group GP and the axle drive AB, or both between the main transmission HG and the downstream group GP and also between the downstream group GP and the axle drive AB, or it can be decoupled completely from the force flow or torque flow of the drivetrain.

In contrast, if a shifting element S1, S2 configured as a dual shifting element is used, then only three of the above-mentioned variants for coupling the electric machine EM into, or decoupling it from the force flow or torque flow of the drivetrain can be realized. In this case, depending on the shift position of the dual shifting element the electric machine EM can be coupled into the force or torque flow of the drivetrain either exclusively between the main transmission HG and the downstream group GP, or exclusively between the downstream group GP and the axle drive AB, or it can be completely decoupled from the force flow or torque flow of the drivetrain.

Figure 2:
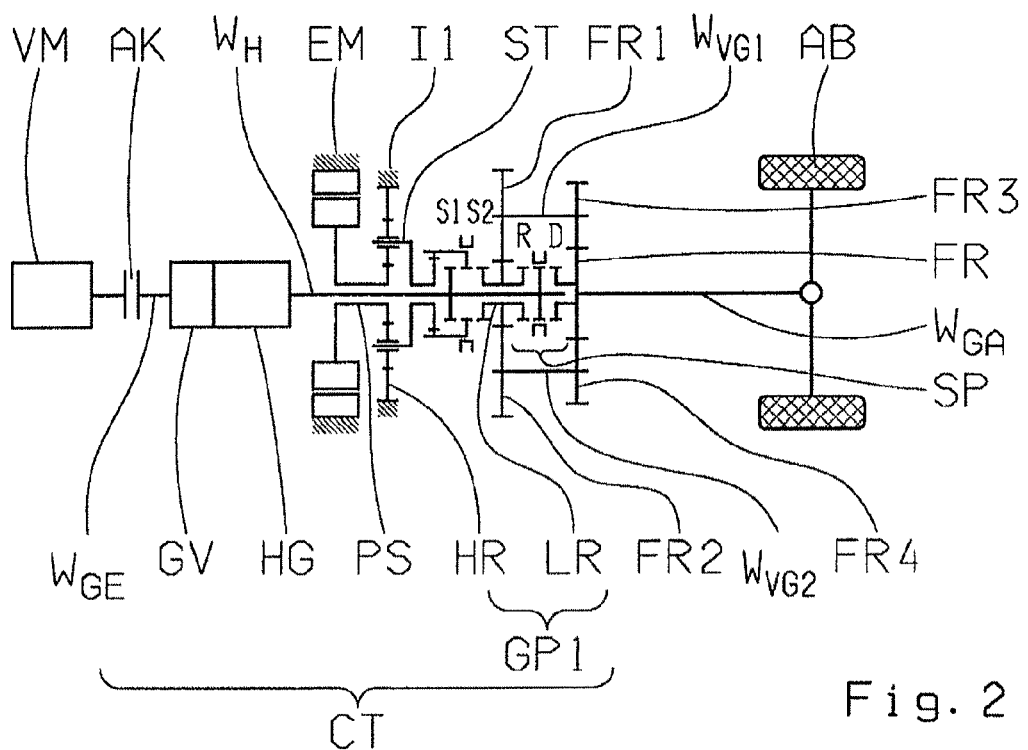
FIG. 2: Layout of a drivetrain according to the invention according to a second example embodiment of the invention.
Figure 3:
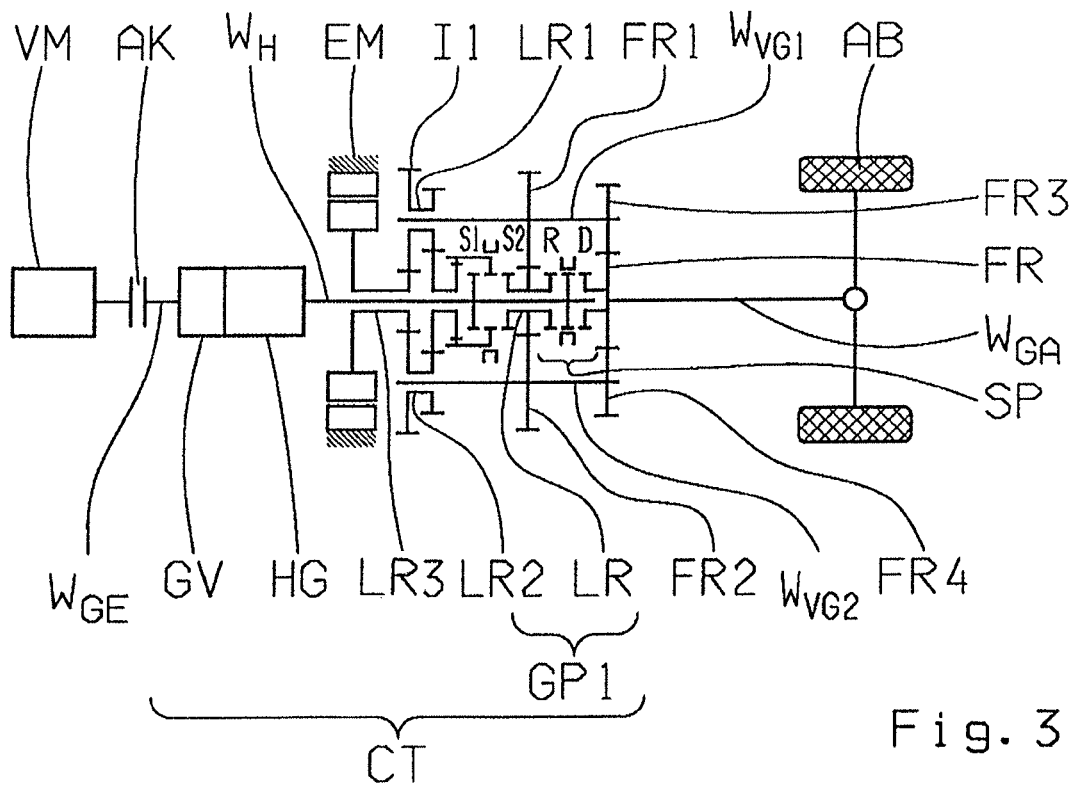
FIG. 3: Layout of a drivetrain according to the invention according to a third example embodiment of the invention.
Figure 4:
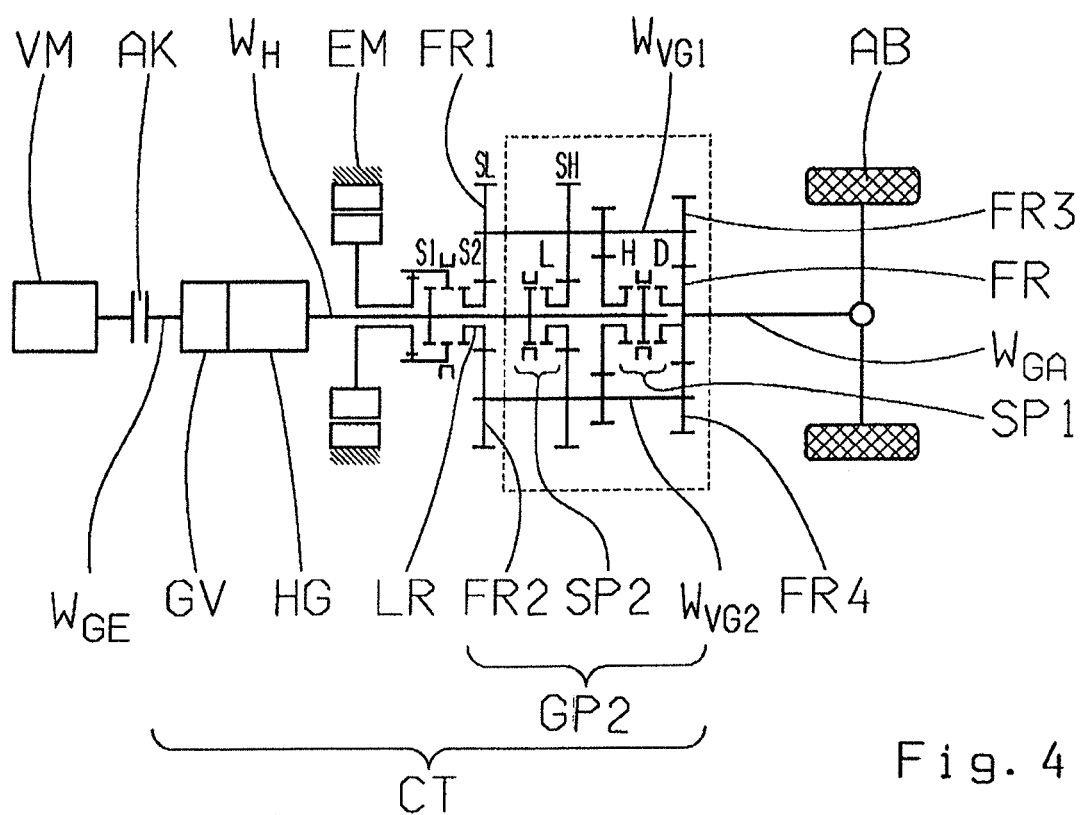
FIG. 4: Layout of a drivetrain according to the invention according to a fourth example embodiment of the invention.

As already mentioned, in the context of the present invention the downstream group GP in drive connection downstream from the main transmission HG is of countershaft design. FIGS. 1 to 3 show variants of the invention in which the downstream group GP of countershaft design is in the form of a range group GP1, whereas in contrast, FIG. 4 shows an embodiment of the invention in which the downstream group GP is in the form of a splitter group GP2. In either case, when a gearshift is carried out in the automated group transmission CT the traction force of the axle drive AB can be supported by virtue of the electric machine EM.

As already mentioned, FIG. 1 shows a variant of the invention in which the downstream group GP is in the form of a range group GP1 of countershaft design, such that the downstream group GP is made as a range group GP1 comprising a loose wheel LR mounted on a main shaft $W_H$ of the group transmission CT or coupled to the main shaft $W_H$, a fixed wheel FR coupled to the transmission output shaft $W_{GA}$, and at least one countershaft, the example embodiment in FIG. 1 in fact having two countershafts $W_{VG1}$ and $W_{VG2}$.

With each countershaft $W_{VG1}$ and $W_{VG2}$ are coupled two fixed wheels FR1, FR3 and FR2, FR4 respectively, such that the fixed wheel FR1 of the countershaft $W_{VG1}$ and the fixed wheel FR2 of the countershaft $W_{VG2}$ mesh with the loose wheel LR, whereas both the fixed wheel FR3 of countershaft $W_{VG1}$ and the fixed wheel FR4 of countershaft $W_{VG2}$ mesh with the fixed wheel FR positioned on the output shaft $W_{GA}$. By means of a shifting packet SP the range group GP1 can be changed or shifted between a range driving step R and a direct driving step D.

As already mentioned, depending on the shift position of at least one shifting element S1, S2, the electric machine EM is coupled into or decoupled from the force flow or torque flow of the drivetrain, and in FIG. 1, when the shift position S1 of the shifting element S1/S2 made as a dual shifting element is engaged, the electric machine EM is connected to the main shaft $W_H$ of the group transmission CT and is then coupled, between the main transmission HG and the range group GP1, into the force flow or torque flow of the drivetrain. In contrast, when the shift position S2 is engaged the electric machine EM is coupled to the loose wheel LR and connected, via the countershafts $W_{VG1}$ and $W_{VG2}$, to the transmission output shaft $W_{GA}$, so that in this case the electric machine EM is coupled into the force flow or torque flow of the drivetrain between the range group GP1 and the axle drive AB.

In the example embodiment of FIG. 1, when—with the shift position S2 of the dual shifting element engaged—the electric machine EM is connected to the transmission output shaft $W_{GA}$, the electric machine EM is connected to the axle drive AB via the gear ratio of the downstream group GP or range group GP1.

This takes place regardless of the shift position of the range group GP1 itself, i.e. regardless of whether the range group GP1 is shifted into the direct driving step D or the range driving step R.

Even when a shift is carried out in the downstream group GP, support for the traction force can be provided at the axle drive AB. When a shift is carried out in the downstream group GP, before the shift is carried out in the downstream group GP, the electric machine EM of the hybrid drive is coupled to the axle drive AB, so that while the shift is taking place in the downstream group GP the electric machine EM remains coupled to the axle drive AB in order to compensate or make up for the traction force interruption.

As already mentioned, during this the electric machine EM acts upon the axle drive AB with the gear ratio of the downstream group GP. Even when a gearshift is carried out in the main transmission HG and the upstream group GV if present, such traction force support can be provided at the axle drive AB. It should be mentioned that if the dual shifting element is in shift position S1 and the range group GP1 is shifted to the direct driving step D, the gear ratio of the range group GP1 is not effective.

With the drivetrain of FIG. 1, when the vehicle is started from rest and then accelerated further and the downstream group GP or range group GP1 is in the range driving step R, the electric machine EM can be coupled into the force flow or torque flow of the drivetrain from the beginning. Regardless of whether the shift position S1 or S2 is now engaged, the electric machine EM acts upon the axle drive AB with the gear ratio of the downstream group GP.

After shifting the range group GP1 to the direct driving step D, by virtue of shift position S1 the electric machine EM can also be shifted through to the axle drive AB in the direct gear with no gear ratio.

When the drivetrain of FIG. 1 is operated at a high vehicle speed, by engaging the shift position S1 in the range group GP1 the electric machine EM is preferably coupled to the main shaft $W_H$ between the main transmission HG and the downstream group GP or range group GP1 and acts upon the axle drive AB in the direct drive step of the range group GP1 with no gear ratio. If the vehicle speed slows down and a gearshift is to be carried out, shortly before carrying out the shift in the range group GP1 the electric machine is coupled to the output shaft $W_{GA}$ by virtue of a connection to the loose wheel LR with the shift position S2 engaged, and is thus coupled into the force flow or torque flow between the range group GP1 and the axle drive AB.

After carrying out the shift in the range group GP1, the electric machine EM can either be coupled by shift position S1 to the main shaft $W_H$, or remain coupled by shift position S2 to the output shaft $W_{GA}$ of the group transmission CT.

FIGS. 2 and 3 show advantageous further developments of the drivetrain of FIG. 1, in which the electric machine EM is coupled into the force flow or torque flow of the drivetrain with intermediate connection of a gear ratio I1.

Thus, FIG. 2 shows a variant of the invention in which a constant gear ratio step I1 of planetary configuration is positioned between the electric machine EM and the range group GP1.

The gear ratio step I1 of planetary structure is connected between the electric machine EM and the dual shifting element with the shift positions S1, S2 in such manner that the constant gear ratio step I1 is effective both when the electric machine EM is coupled into the force flow or torque flow of the drivetrain between the main transmission HG and the downstream group GP in shift position S1, and also when the electric machine EM is coupled into the force flow or torque flow of the drivetrain in the shift position S2 between the downstream group GP and the axle drive AB.

In FIG. 2 it can be seen that in this case the electric machine EM is coupled with the sun gear PS of the constant gear ratio step I1 of planetary structure, whereas the dual shifting element with the shift positions S1 and S2 engages with the carrier ST of the gear ratio step S1. A ring gear HR of the constant gear ratio step I1 of planetary structure is connected fixed to the housing.

FIG. 3 shows a variant of the invention, in which the constant gear ratio step I1 connected between the electric machine EM and the dual shifting element with the two shifting positions S1 and S2, is of countershaft design.

Thus, the constant gear ratio step I1 in the example embodiment in FIG. 3 has loose wheels LR1, LR2 and LR3 coupled with the main shaft $W_H$ and with the—or with each—countershaft $W_{VG1}$ and $W_{VG2}$. In this case the loose wheel LR3 is mounted on the main shaft $W_H$ of the automated group transmission CT. In contrast, the loose wheels LR1 and LR2 are mounted on the countershafts $W_{VG1}$ and $W_{VG2}$. The loose wheels LR1 and LR2 mounted on the countershafts $W_{VG1}$ and $W_{VG2}$ mesh with the loose wheel LR3 mounted on the main shaft $W_H$.

The constant gear ratio step I1 in FIG. 3 too, is effective in both shift positions S1 and S2 of the dual shifting element, i.e. both in shift position S1 when the electric machine EM is coupled into the force or torque flow of the drivetrain between the main transmission HG and the range group GP1, and also when in shift position S2 the electric machine EM is coupled into the force or torque flow of the drivetrain, via the loose wheel LR and the countershafts $W_{VG1}$ and $W_{VG2}$, between the downstream group GP or range group GP1 and the axle drive AB.

FIG. 4 shows a variant of the invention in which the downstream group GP is in the form of a splitter group GP2, the splitter group GP2 shown in FIG. 4 comprising two shifting packets SP1 and SP2 in order to shift various driving steps of the splitter group GP2, namely a direct driving step D, a low driving step L and a high driving step H.

Depending on the shift position of the dual shifting element S1, S2 the electric machine EM is either, in shift position S1, connected to the main shaft $W_H$ of the group transmission CT and thus coupled into the force or torque flow of the drivetrain between the main transmission HG and the splitter group GP2, or in shift position S2, coupled via the loose wheel LR and the countershafts $W_{VG1}$ and $W_{VG2}$ of the splitter group GP2 to the output shaft $W_{GA}$ and thus connected into the force flow or torque flow of the drivetrain between the splitter group GP2 and the axle drive AB.

Whenever a shift is carried out in the splitter group GP2, by virtue of the shift position S2 of the dual shifting element the electric machine EM is always connected via the countershafts $W_{VG1}$ and $W_{VG2}$ to the transmission output shaft $W_{GA}$, in order to provide traction force support at the axle drive AB when a shift is taking place in the splitter group GP2.

In the example embodiments shown in FIGS. 1 to 3, in which the downstream group GP is in the form of a 2-gear range group GP1, the loose wheel LR by means of which the electric machine EM can be connected via the countershafts $W_{VG1}$ and $W_{VG2}$ to the output shaft $W_{GA}$ of the group transmission CT is a loose wheel which is in any case present in the range group GP1.

In contrast, in the example embodiment of FIG. 4 a separate loose wheel LR in which the fixed wheels FR1 and FR2 of the countershafts $W_{VG1}$ and $W_{VG2}$ mesh is used, since in the 3-gear splitter group GP2 of FIG. 4 existing loose wheels are not freely accessible. Thus, the loose wheel LR and the fixed wheels FR1 and FR2 in the example embodiment of FIG. 4 form an addition wheel pair.

Although not necessary, an additional wheel pair of this type can also be used in the variants shown in FIGS. 1 to 3.

By using an additional wheel pair, the gear ratio of the downstream group GP acting between the electric machine EM and the axle drive AB can be varied.

By using an additional wheel pair of such type to connect the electric machine EM to the countershafts $W_{VG1}$ and $W_{VG2}$ of the downstream group, an additional gear can be produced or provided for the electric machine EM. The additional gear can either be lower or higher than the gear ratio of the downstream group. If the additional gear is lower than the gear ratio of the downstream group, an electric torque can be produced at low driving speeds.

If the additional gear is higher than the gear ratio of the downstream group, a step interval to the direct driving step D can be made smaller. This is particularly advantageous, since in such a case a harmonic gear sequence can be achieved for the electric machine EM when a shift is carried out in the downstream group GP.

With the variant shown in FIG. 4 the additional gear that can be produced by the additional wheel pair is advantageously chosen such that a favorable step interval for the electric machine EM between the shift positions S1 and S2 is obtained, and this regardless of the driving step L, H or D is selected in the 3-gear splitter group GP2.

In the variant in FIG. 4 as well, in accord with the example embodiments shown in FIGS. 2 and 3, the constant gear ratio step I1 of planetary or countershaft configuration can be connected between the electric machine EM and the dual shifting element with shift positions S1 and S2.

Instead of the dual shifting element S1, S2 of the example embodiments shown in FIGS. 1 to 4, it is possible to choose separately controllable shifting elements S1 and S2. Then, the electric machine EM can be coupled into the force flow or torque flow both between the main transmission HG and the downstream group GP and also between the downstream group GP and the axle drive AB, in order to lock the output shaft for example for creating a parking lock.

INDEXES

AB Axle drive
AK Starting clutch
CT Group transmission
D Direct drive step
EM Electric machine
FR Fixed wheel
FR1 Fixed wheel
FR2 Fixed wheel
FR3 Fixed wheel
FR4 Fixed wheel
GV Upstream group
GP Downstream group
GP1 Range group
GP2 Splitter group
H High driving step
HG Main transmission
HR Ring gear
I1 Gear ratio step
L Low driving step
LR Loose wheel
LR1 Loose wheel
LR2 Loose wheel
LR3 Loose wheel
PS Sun gear
R Range driving step
SP Shifting packet
SP1 Shifting packet
SP2 Shifting packet
S1 Shifting element/shift position
S2 Shifting element/shift position
ST Carrier
VM Internal combustion engine
$W_{GA}$ Output shaft
$W_{GE}$ Input shaft
$W_H$ Main shaft
$W_{VG1}$ Countershaft
$W_{VG1}$ Countershaft
$W_{VG2}$ Countershaft

The invention claimed is:

1. A drivetrain of a motor vehicle with a hybrid drive, the drivetrain comprising:
an internal combustion engine (VM),
an electric machine (EM); and
a semi-automatic group transmission (CT);
the semi-automatic group transmission (CT) comprising at least a main transmission (HG) and a downstream group (GP) that is in drive connection downstream of the main transmission (HG);
an input shaft ($W_{GE}$) of the semi-automatic group transmission (CT) being connected, via a controllable starting clutch (AK), to the internal combustion engine (VM) of the hybrid drive;
an output shaft ($W_{GA}$) of the semi-automatic group transmission (CT) being connected to an axle drive (AB); and
at least one shifting element (S1, S2) which couples the electric machine (EM) into either a force flow or a torque flow of the drivetrain,
in one shift position of the at least one shifting element, the electric machine is coupled into either the force flow or the torque flow between the main transmission (HG) and the downstream group (GP) of a countershaft design and
in another shift position of the at least one shifting element, the electric machine is exclusively coupled into either the force flow or the torque flow between the downstream group (GP) of the countershaft design and the axle drive (AB).

2. The drivetrain according to claim 1, wherein depending on the shift positions of at least two shifting elements (S1, S2), the electric machine (EM) of the hybrid drive is coupleable into the force flow or the torque flow of the drivetrain exclusively between the main transmission (HG) and the downstream group (GP), exclusively between the downstream group (GP) and the axle drive (AB), and both between the main transmission (HG) and the downstream group (GP) and also between the downstream group (GP) and the axle drive (AB), and the electric machine (EM) is completely is completely disengagable from the force flow or the torque flow of the drivetrain.

3. The drivetrain according to claim 1, wherein the at least one shifting element is a dual shifting element and depending on the shift position of the dual shifting element (S1, S2), the electric machine (EM) of the hybrid drive is coupleable into either the force flow or the torque flow of the drivetrain exclusively between the main transmission (HG) and the downstream group (GP), and exclusively between the downstream group (GP) and the axle drive (AB), and is completely disengagable from the force flow or the torque flow of the drivetrain.

4. The drivetrain according to claim 1, wherein the downstream group (GP) of the countershaft design comprises a loose wheel (LR) coupled to a main shaft ($W_H$) of the group transmission (CT), a fixed wheel (FR) coupled to a transmission output shaft ($W_{GA}$) of the group transmission (CT) and at least one countershaft ($W_{VG1}$, $W_{VG2}$), a first and a second fixed wheel (FR1, FR3; FR2, FR4) are coupled to the at least one countershaft ($W_{VG1}$, $W_{VG2}$), the first fixed wheel (FR1, FR2) meshes with the loose wheel (LR) coupled to the main shaft ($W_H$) and the second fixed wheel (FR3, FR4) meshes with the fixed wheel (FR) coupled to the transmission output shaft (WGA), such that when the electric machine (EM) is connected into either the force flow or the torque flow of the drivetrain, between the main transmission (HG) and the downstream group (GP), the electric machine (EM) is connected to the main shaft ($W_H$), and when the electric machine (EM) is disconnected from the force flow or the torque flow of the drivetrain between the main transmission and the downstream group and is coupled into either the force flow or the torque flow of the drivetrain, between the downstream group (GP) and the axle drive (AB), the electric machine (EM) is connected, via the loose wheel (LR) and the at least one countershaft ($W_{VG1}$, $W_{VG2}$), to the transmission output shaft ($W_{GA}$).

5. The drivetrain according to claim 1, wherein the electric machine (EM) of the hybrid drive is coupled into either the force flow or the torque flow of the drivetrain via an intermediate connection of a gear ratio step (1).

6. The drivetrain according to claim 5, wherein the gear ratio step (I1) is of a planetary design and is connected between the electric machine (EM) and the at least one shifting element (S1, S2) such that the gear ratio step (I1) is effective both when the electric machine (EM) is coupled to either the force flow or the torque flow of the drivetrain between the main transmission (HG) and the downstream group (GP), and also when the electric machine (EM) is coupled to either the force flow or the torque flow of the drivetrain between the downstream group (GP) and the axle drive (AB).

7. The drivetrain according to claim 5, wherein the gear ratio step (I1) is formed by loose wheels (LR1, LR2, LR3) mounted on the main shaft ($W_H$) and on the at least one countershaft ($W_{VG1}$, $W_{VG2}$), and is connected between the electric machine (EM) and the at least one shifting element (S1, S2) such that the gear ratio step (I1) is effective both when the electric machine (EM) is coupled to either the force flow or the torque flow of the drivetrain between the main transmission (HG) and the downstream group (GP), and also when the electric machine (EM) is coupled to either the force flow or the torque flow of the drivetrain between the downstream group (GP) and the axle drive (AB).

8. The drivetrain according to claim 1, wherein the downstream group (GP) is a range group (GP1).

9. The drivetrain according to claim 1, wherein the downstream group (GP) is a splitter group (GP2).

10. A method for operating a drivetrain comprising an internal combustion engine (VM), an electric machine (EM) and a semi-automatic group transmission (CT), the semi-automatic group transmission (CT) comprising at least a main transmission (HG) and a downstream group (GP) that is in drive connection downstream from the main transmission (HG), an input shaft ($W_{GE}$) of the semi-automatic group transmission (CT) is connected, via a controllable starting clutch (AK), to the internal combustion engine (VM) of the hybrid drive and an output shaft ($W_{GA}$) of the semi-automatic group transmission (CT) is connected to an axle drive (AB), at least one shifting element (S1, S2) which couples the electric machine (EM) into either a force flow or a torque flow of the drivetrain, in one shift position of the at least one shifting element, the electric machine is coupled into the force flow or the torque flow between the main transmission (HG) and the downstream group (GP) of a countershaft design and in another shift position of the at least one shifting element, the electric machine is exclusively coupled into the force flow or the torque flow between the downstream group (GP) of the countershaft design and the axle drive (AB), the method comprising the steps of:
carrying out a gearshift in the main transmission (HG); and
one of compensating or counteracting an interruption of traction force at the axle drive (AB) by operation of the electric machine (EM) of the hybrid drive.

11. The method according to claim 10, further comprising the step of drivingly connecting an upstream group (GV) upstream from the main transmission (HG), and either compensating or counteracting the interruption in the traction force at the axle drive (AB) with the electric machine (EM) of the hybrid drive when a gearshift is carried out in the upstream group (GV).

12. The method for operating a drivetrain according to claim 11, further comprising the step of coupling the electric machine (EM) of the hybrid drive to the axle drive (AB), before carrying out a gearshift in the downstream group (GP) when a gearshift is to be carried out in the downstream group (GP), and maintaining the coupling between the electric machine (EM) and the axle drive (AB) while the gearshift is carried out in the downstream group (GP) to either compensate or counteract the interruption in the traction force.

13. The method according to claim 12, further comprising the step of coupling the electric machine (EM) of the hybrid drive to the main shaft ($W_H$) between the main transmission (HG) and the downstream group (GP), which is formed as a range group (GP1), when a gearshift is not being carried out and at high driving speeds, and in that case a direct drive step in the downstream group (GP) is used, and immediately before a shift is carried out in the downstream group (GP) the electric machine (EM) is coupled to the transmission output shaft ($W_{GA}$) between the downstream group (GP) and the axle drive (AB), and in that case a range driving step of the downstream group (GP) is used.

14. A drivetrain of a motor vehicle having a hybrid drive, the drivetrain comprising:
an internal combustion engine (VM),
an electric machine (EM), and
an automated group transmission (CT),
the automated group transmission (CT) comprising at least a main transmission (HG) and a downstream group (GP), the downstream group (GP) being drivingly connected with and located downstream from the main transmission (HG) with respect to a flow of force in the drivetrain, and the downstream group (GP) having at least one countershaft;
the internal combustion engine (VM) of the hybrid drive being connectable to an input shaft ($W_{GE}$) of the automated group transmission (CT) by a controllable starting clutch (AK);
an output shaft ($W_{GA}$) of the automated group transmission (CT) being connected to an axle drive (AB); and
at least one shifting element (S1, S2) being shiftable between a plurality of shift positions,
in a first shift position of the at least one shifting element, the electric machine (EM) is coupled to the flow of force in the drivetrain between the main transmission (HG) and the downstream group (GP),
in a second shift position of the at least one shifting element, the electric machine (EM) is disengaged from the flow of force in the drivetrain between the main transmission (HG) and the downstream group (GP) and is coupled in the flow of force in the drivetrain between the downstream group (GP) and the axle drive (AB).

15. The drivetrain according to claim 14, wherein in the second shift position of the at least one shifting element, the electric machine is coupled to the at least one countershaft of the downstream group.

16. The drivetrain according to claim 14, wherein the automated group transmission comprises a main shaft that extends from the main transmission to the downstream group, the main shaft supports at least one loose gear and has at least one fixed gear continually fixed thereto,
in the first shift position, the at least one shifting element couples the electric machine, via the fixed gear, to the main shaft, and
in the second shift position, the at least one shifting element decouples the electric machine from the main shaft and couples the electric machine, via the loose gear, to the at least one countershaft of the downstream group.

17. The drivetrain according to claim 14, wherein the at least one shifting element is a dual shifting element and is drivingly connected to the electric machine, the automated group transmission comprises a main shaft that extends from the main transmission to the downstream group, the main shaft supports at least one loose gear and has at least one fixed gear continually fixed thereto, and
in the first shift position, the dual shifting element engages the at least one fixed gear and couples the electric machine to the main shaft, and in the second shift position, the dual shifting element is disengaged from the at least one fixed gear and engages the at least one loose gear and couples the electric machine to the at least one countershaft of the downstream group.

* * * * *